United States Patent
Lee et al.

(10) Patent No.: US 10,286,309 B2
(45) Date of Patent: May 14, 2019

(54) THREE-DIMENSIONAL IMAGE DEVICE FOR PROVIDING IMPROVED SENSE OF IMMERSION AND GAME DEVICE USING SAME

(71) Applicant: TOVIS CO., LTD., Incheon (KR)

(72) Inventors: Kyung Ha Lee, Changwon-si (KR); Hwan Jin Kim, Incheon (KR); Ryong Min Park, Goyang-si (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 15/757,373

(22) PCT Filed: Sep. 4, 2015

(86) PCT No.: PCT/KR2015/009373
§ 371 (c)(1),
(2) Date: Mar. 5, 2018

(87) PCT Pub. No.: WO2017/039041
PCT Pub. Date: Mar. 9, 2017

(65) Prior Publication Data
US 2019/0022524 A1    Jan. 24, 2019

(51) Int. Cl.
*A63F 13/26*    (2014.01)
*G02B 27/22*    (2018.01)
(Continued)

(52) U.S. Cl.
CPC .............. *A63F 13/26* (2014.09); *A63F 13/28* (2014.09); *A63F 13/53* (2014.09); *G02B 27/22* (2013.01); *H04N 13/363* (2018.05)

(58) Field of Classification Search
CPC .......... A63F 13/26; A63F 13/28; A63F 13/53; H04N 13/363; G02B 27/22
(Continued)

(56) References Cited

U.S. PATENT DOCUMENTS 6,752,498 B2 * 6/2004 Covannon ............ G02B 27/225
                                                     351/240
8,210,922 B2 * 7/2012 Williams ............ G07F 17/3211
                                                     345/2.2
(Continued)

FOREIGN PATENT DOCUMENTS

JP    05-000186 A    1/1993
JP    2003-009036 A    1/2003
(Continued)

OTHER PUBLICATIONS

International Search Report for PCT/KR2015/009278 dated Jun. 2016 from Korean Intellectual Property Office.

*Primary Examiner* — Allen Chan
(74) *Attorney, Agent, or Firm* — Revolution IP, PLLC

(57) ABSTRACT

A three-dimensional image device for providing an improved sense of immersion includes: a moving stage that includes a seat on which a viewer sits and a seat moving mechanism for moving the seat; a first transparent curved display located in front of the viewer and having a curved surface shape that is concave in the direction in which the viewer watches the first curved display, wherein the seat moves according to a first displayed image; and a second curved display located behind the first curved display and having a curved surface shape that is concave in the direction in which the viewer watches the second curved display, wherein the second curved display displays a second image overlapping the first image. Accordingly, it is possible to enhance the three-dimensional effect of a three-dimensional image, to increase a sense of immersion, and to improve a sense of realism.

16 Claims, 5 Drawing Sheets

(51) Int. Cl.
*A63F 13/53* (2014.01)
*A63F 13/28* (2014.01)
*H04N 13/363* (2018.01)

(58) Field of Classification Search
USPC .......................................................... 463/31
See application file for complete search history.

(56) References Cited

U.S. PATENT DOCUMENTS

| | | | |
|---|---|---|---|
| 8,272,957 B2 * | 9/2012 | Crowder, Jr. ....... | G07F 17/3211 345/173 |
| 8,715,079 B1 * | 5/2014 | Loose ................ | G07F 17/3211 463/30 |
| 8,851,985 B2 * | 10/2014 | Rasmussen ......... | G07F 17/3211 463/20 |
| 2007/0004513 A1 * | 1/2007 | Wells ................ | G07F 17/3202 463/31 |
| 2007/0009222 A1 | 1/2007 | Koo et al. | |
| 2008/0178501 A1 | 7/2008 | Crowell et al. | |
| 2017/0150108 A1 * | 5/2017 | Kong ................ | G02B 27/2292 |

FOREIGN PATENT DOCUMENTS

| | | |
|---|---|---|
| JP | 2015-147564 A | 8/2015 |
| KR | 10-1182470 B1 | 9/2012 |
| KR | 10-1235273 B1 | 2/2013 |

\* cited by examiner

[FIG.1]
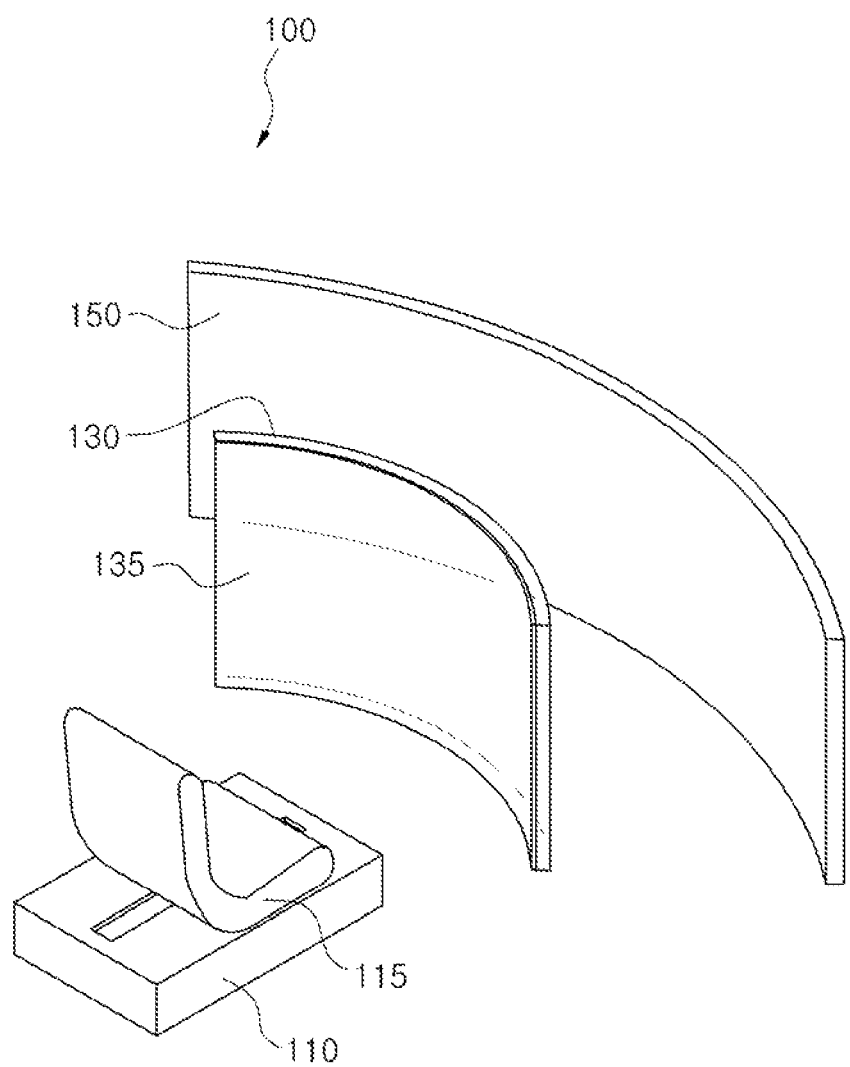

[FIG.2]
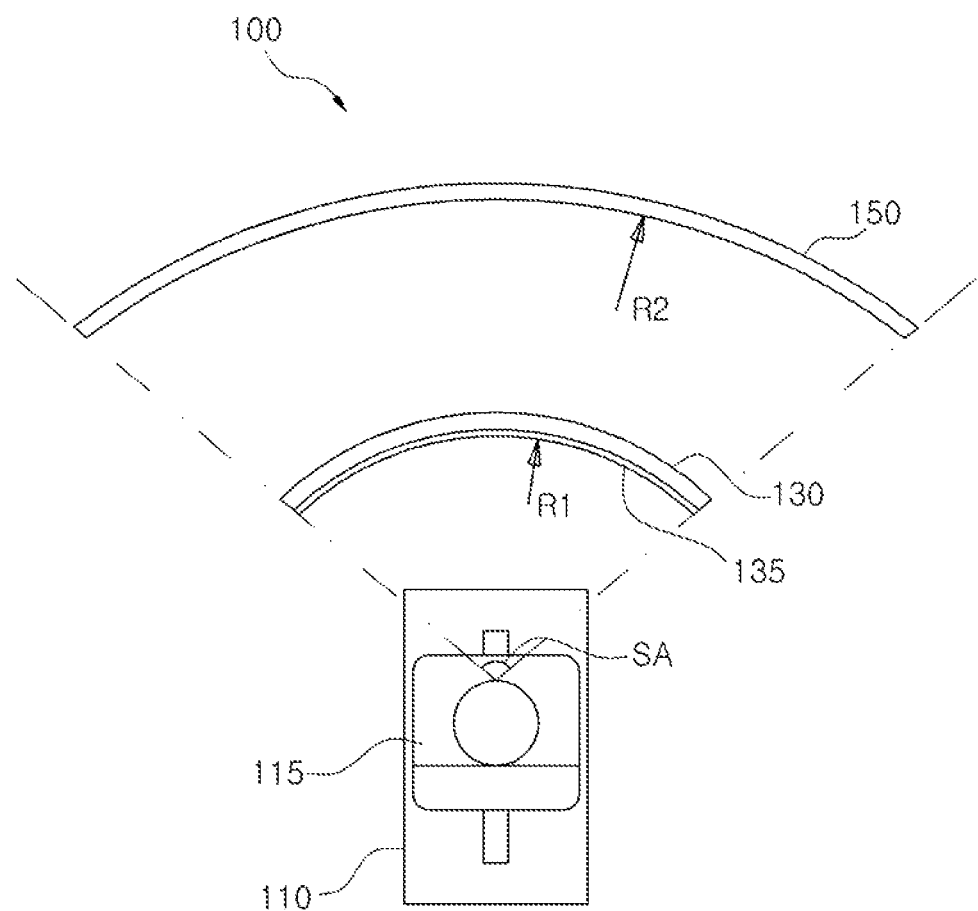

[FIG.3]
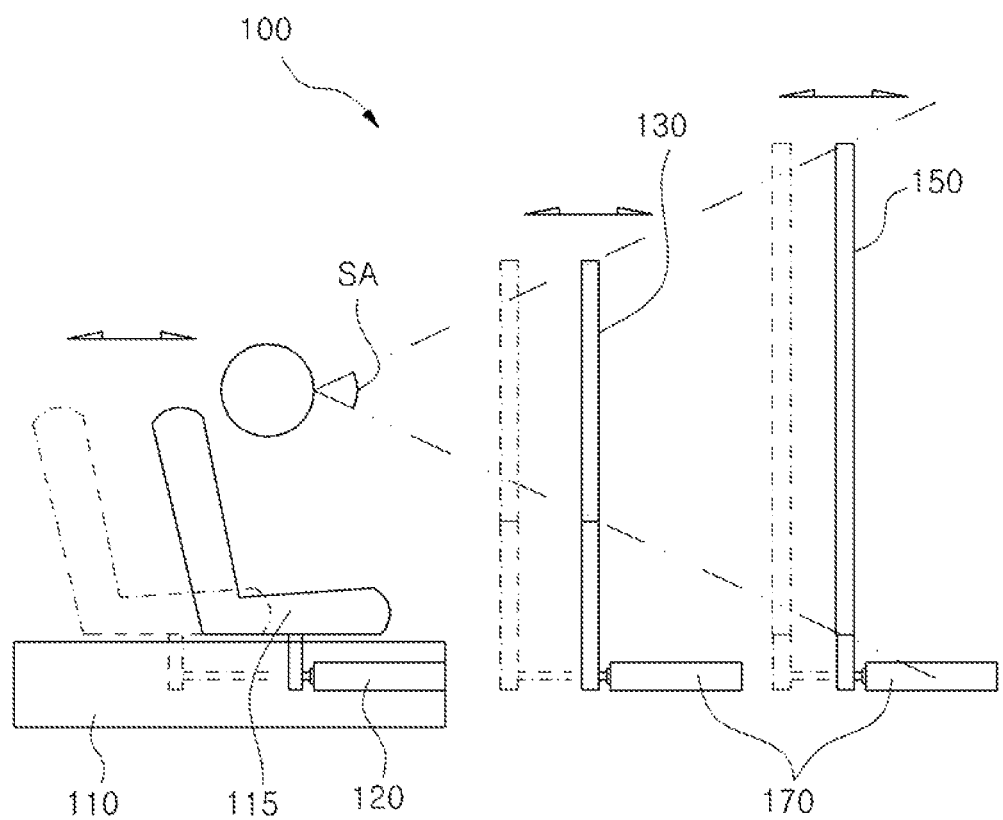

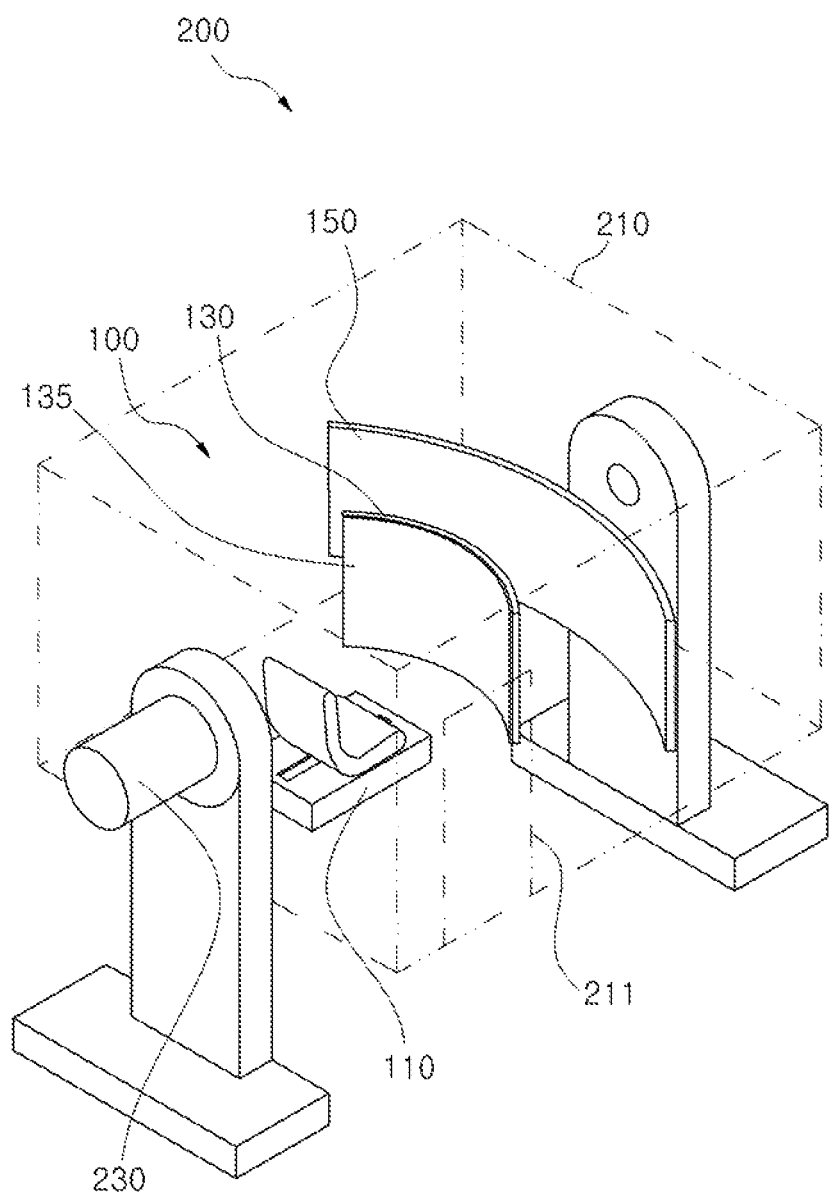
[FIG.4]

[FIG.5]
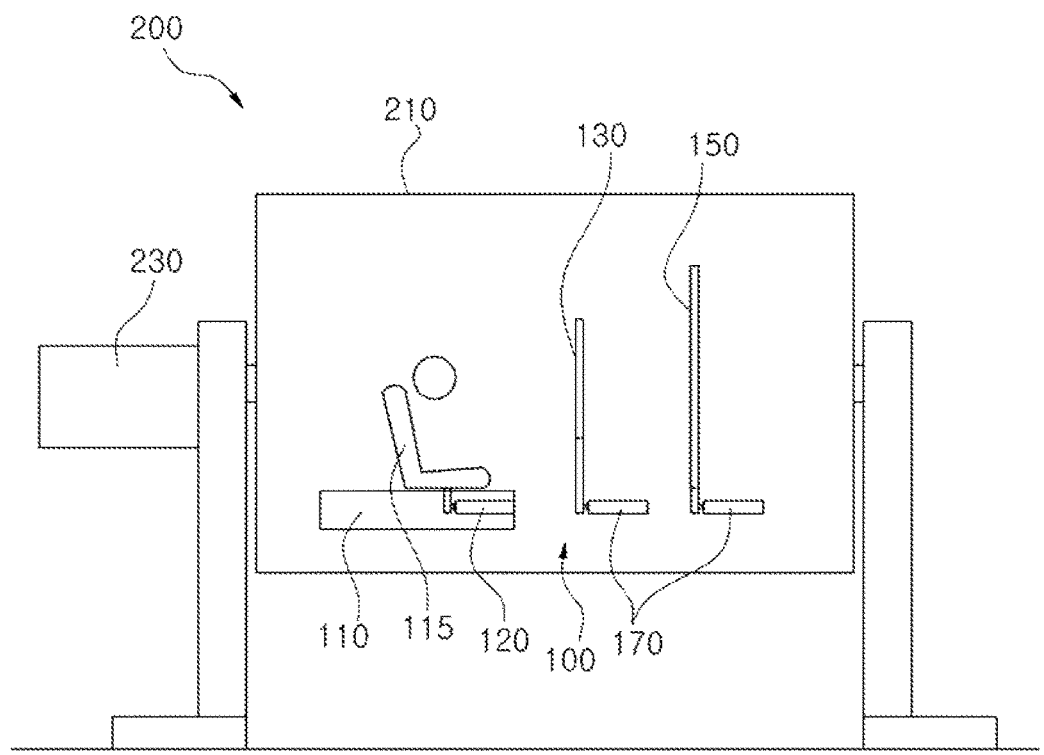

THREE-DIMENSIONAL IMAGE DEVICE FOR PROVIDING IMPROVED SENSE OF IMMERSION AND GAME DEVICE USING SAME

TECHNICAL FIELD

The present invention relates to a stereoscopic image device that gives a three-dimensional effect to an image and a game apparatus using the same.

BACKGROUND ART

In general, a stereoscopic image device is a device that enables an image to be seen in a three-dimensional fashion. Such a stereoscopic image device converts an image to be output and then displays the converted image, and a viewer who views the converged image through specially produced glasses may view a stereoscopic image via interaction of the glasses and a display.

The stereoscopic image device that provides viewing of a stereoscopic image via glasses, however, prevents the viewer from viewing a general image as well as a stereoscopic image when the viewer loses his/her glasses because the stereoscopic image device also converts the general image. Therefore, a stereoscopic image device, which enables the viewing of a stereoscopic image without specially produced glasses, has recently been developed.

As an example of such a stereoscopic image device, Korean Patent Registration Publication No. 10-1182470 (published on Dec. 9, 2012) discloses "MEDIA BOX HAVING THREE-DIMENSIONAL EFFECT USING TRANSPARENT LCD PANEL".

The conventional media box refers to a media box including a plurality of LCD panels. More specifically, the media box includes a polygonal case, which is provided at one lateral side thereof with a door that is opened and closed in an On/Off manner and at the front side thereof with a transparent window and defines a predetermined inner space therein, and a backlight. The media box further includes a general LCD panel, which is fixedly installed to the one interior side wall surface of the case, a transparent LCD panel, which is fixedly installed parallel to the general LCD panel so as to be spaced apart therefrom while maintaining a constant distance therebetween, a lamp, which is provided in the space between the general LCD panel and the transparent LCD panel to perform surface emission, and a control box, which is connected to the LCD panel and the transparent LCD panel to recognize a distance value (along the Z-axis) corresponding to the space between the general LCD panel and the transparent LCD panel, which are arranged back and forth, and analyzes images displayed on the general LCD panel and the transparent LCD panel to recognize the coordinate values (along the X-axis and the Y-axis) and the color values (RGB), thereby controlling the images displayed via the LCD panel and the transparent LCD panel. With this configuration, the media box may accurately display an image having a three-dimensional effect and perspective without glasses.

However, because the conventional media box displays an image on a flat display panel, when a viewer views overlapping images displayed on several display panels, the three-dimensional effect of the images may be deteriorated.

In addition, because all edges of the display panels, which overlap each other, are seen, the viewer may perceive an image as if it were made by overlapping several images, rather than perceiving a stereoscopic image, which deteriorates the three-dimensional effect of the image.

In addition, because the viewer can only perceive a stereoscopic image visually, immersiveness in the stereoscopic image may be deteriorated.

DISCLOSURE

Technical Problem

The present invention has been made to solve the problems described above, and an object of the present invention is to provide a stereoscopic image device, which may improve the three-dimensional effect of a stereoscopic image displayed on a display, may provide a viewer with a sense of realism based on a stereoscopic image, and may improve immersiveness in a stereoscopic image, and a game apparatus using the same.

Technical Solution

In order to achieve the above-described object, in accordance with an aspect of the present invention, a stereoscopic image device having improved immersiveness, includes a moving stage comprising a seat on which a viewer sits, and a seat movement mechanism configured to move the seat based on a displayed image, a first curved display located in front of the viewer facing thereto to display a first image, the first curved display being transparent and having a concavely curved shape in a direction viewed by the viewer, and a second curved display located behind the first curved display to display a second image overlapping the first image, the second curved display having a concavely curved shape in the direction viewed by the viewer.

The stereoscopic image device may further include a display movement mechanism configured to move positions of the first curved display and the second curved display in association with each other according to movement of the seat on the moving stage.

The second curved display may have a size larger than a size of the first curved display.

The second curved display may be sized such that an edge thereof is located along a side of a viewing angle, which is defined by connecting the viewer to an edge of the first curved display, or may be sized such that the edge thereof is located at a position deviating from the side of the viewing angle.

The stereoscopic image device may further include an operating mechanism configured to be operated by the viewer in order to control the images.

The stereoscopic image device may further include an operating mechanism in the form of a touch panel that overlaps the first curved panel and generates an operating signal.

The second curved display may be one selected from among a screen on which an image is displayed by a beam projector, an LCD, an OLED, and a PDP.

The first curved display and the second curved display may have different curvatures.

In accordance with another aspect of the present invention, a game apparatus using a stereoscopic image device having improved immersiveness includes the stereoscopic image device having improved immersiveness according to the aspect of the present invention, a game box in which the stereoscopic image device is accommodated, and a box driving mechanism configured to move the game box according to a game displayed on the stereoscopic image device.

Advantageous Effects

According to the present invention, a first display and a second display, which display images, are formed to have a curved shape, which may improve the three-dimensional effect and immersiveness in an image. The three-dimensional effect of the image may be further improved when an image on the second curved display is viewed through the first curved display so that images on the two displays overlap each other.

In addition, the viewer, the first curved display, and the second curved display are selectively movable to achieve a sense of realism of an image. When the viewer moves so that the first curved display and the second curved display are disposed along the sides of a viewing angle, the immersiveness in an image may be improved.

A game apparatus of the present invention is configured such that a game box in which a stereoscopic image device is accommodated is moved, which may further improve a sense of realism of an image.

DESCRIPTION OF DRAWINGS

FIG. 1 is a perspective view illustrating the schematic configuration of a stereoscopic image device having improved immersiveness according to an embodiment of the present invention.

FIG. 2 is a plan view illustrating the schematic configuration of the stereoscopic image device having improved immersiveness according to the embodiment of the present invention.

FIG. 3 is a side view illustrating the schematic configuration of the stereoscopic image device having improved immersiveness according to the embodiment of the present invention.

FIG. 4 is a perspective view illustrating the schematic configuration of a game apparatus using the stereoscopic image device having improved immersiveness according to the embodiment of the present invention.

FIG. 5 is a side view illustrating the schematic configuration of the game apparatus using the stereoscopic image device having improved immersiveness according to the embodiment of the present invention.

BEST MODE

Hereinafter, an embodiment of the present invention will be described with reference to the accompanying drawings.

As illustrated in FIGS. 1 to 3, the stereoscopic image device 100 having improved immersiveness according to the embodiment of the present invention may include a moving stage 110.

The moving stage 110 may move a viewer. The moving stage 110 may include a seat 115 and a seat movement mechanism 120.

The viewer may sit on the seat 115 so as to view an image, and the seat movement mechanism 120 may move the seat 115 so as to move the viewer.

The seat movement mechanism 120 may rotate the seat 115 to the front side, the rear side, the left side, or the right side of the direction in which the viewer views an image, or at an arbitrary angle relative to the direction, or may vibrate the seat 115.

Here, the seat movement mechanism 120 may be configured with one or more pneumatic or hydraulic cylinders so as to move the seat 115 on the moving stage 110 in various directions. For example, the seat movement mechanism 120 may be configured to be moved by a known mechanical structure that is operated by an electric motor, such as a cam structure, a gear structure, or a link structure, and may have the combined form of a cylinder and a mechanical structure.

In addition, the seat movement mechanism 120 may move the seat 115 based on an image displayed on a first curved display 130 or a second curved display 150, which will be described below.

As illustrated in FIGS. 1 to 3, the stereoscopic image device 100 having improved immersiveness according to the embodiment of the present invention may include the first curved display 130.

The first curved display 130 may display a first image.

The first curved display 130 may be located at the front side of the viewing direction of the viewer, and may display an image so that the viewer who sits on the seat 115 on the moving stage 110 can view the first image.

In addition, in order to improve the three-dimensional effect of the displayed image, the first curved display 130 may be formed to have a concavely curved surface having a curvature R1 when viewed by the viewer. The first curved display 130 may be a transparent display so as to be seen therethrough.

The first curved display 130 may be configured with a transparent LCD or OLED, or may be configured with a PDLC, which is switched between the transparent state and the opaque state.

As illustrated in FIGS. 1 to 3, the stereoscopic image device 100 having improved immersiveness according to the embodiment of the present invention may include the second curved display 150.

The second curved display 150 may display a second image. The second curved display 150 may be located behind the first curved display 130.

Because the second curved display 150 is disposed behind the first curved display 130, the viewer can view the second image displayed on the second curved display 150 through the transparent first curved display 130, and can view the second image combined with the first image displayed on the first curved display 130.

At this time, the first image and the second image may differ from each other, as in the case in which the first image displayed on the first curved display 130 is a main image in a game, and the second image displayed on the second curved display 150 is be a background image. Alternatively, the first image and the second image may be the same image.

Here, even if the first image and the second image are the same image, the displayed images may have a three-dimensional effect because of the distance between the first curved display 130 and the second curved display 150 and the difference in size therebetween.

In addition, the second curved display 150 may have a concavely curved surface when the viewer views the second curved display 150, thereby imparting a three-dimensional effect to the second image. The second curved display 150 may be larger than the first curved display 130.

Meanwhile, the second curved display 150 may be sized such that opposite edges thereof are located on the sides of a viewing angle SA, which is defined by interconnecting the first curved display 130 and the viewer, or may be sized such that opposite edges thereof deviate from the sides of the viewing angle SA.

Here, in the case in which the second curved display 150 is located inside the sides of the viewing angle SA of the first curved display 130, the edges of the second curved display 150 are seen through the first curved display 130, which may deteriorate the three-dimensional effect of an image.

In addition, the second curved display 150 may have a curvature R2 different from the curvature R1 of the first curved display 130.

Here, when the curvature R1 of the second curved display 150 and the curvature R2 of the first curved display 130 differ from each other, there is a distance differential for each position at which the first curved display 130 and the second curved display 150 appear to overlap each other, which may further increase the three-dimensional effect of a displayed image.

In the embodiment, the curvature R1 of the first curved display 130 may be smaller than the curvature R2 of the second curved display 150.

In addition, the second curved display 150 may be configured with an LCD, OLED, or PDP, or may be a screen on which an image of a beam projected from a beam projector is displayed.

As illustrated in FIGS. 1 to 3, the stereoscopic image device 100 having improved immersiveness according to the embodiment of the present invention may include a display movement mechanism 170.

The display movement mechanism 170 may adjust the distance between the first curved display 130 and the second curved display 150, and may move the first curved display 130 and the second curved display 150 in association with each other according to a change in the position of the moving seat 115 on the moving stage 110.

In one example, the display movement mechanism 170 may move the first curved display 130 and the second curved display 150 individually so as to become farther away from or closer to the seat 115 based on a displayed image, regardless of the seat 115.

In another example, the display movement mechanism 170 may move the first curved display 130 and the second curved display 150 so as to maintain the viewing angle SA before movement thereof in association with the seat 115.

That is, when the seat 115 becomes farther away from the first curved display panel 130, the display movement mechanism 170 may move the first curved display 130 and the second curved display 150 individually so as to become closer to the seat 115 in order to maintain the viewing angle SA.

In a further example, when the first curved display 130 is moved so as to become closer to the seat 115, the viewing angle SA, which is defined by connecting the viewer to opposite edges of the first curved display 130, becomes wider. Therefore, the second curved display 150 may be moved so as to be closer to the first curved display 130 so that the edges of the second curved display 150 are aligned with the sides of the viewing angle SA.

Meanwhile, the display movement mechanism 170 may be configured with a hydraulic or pneumatic cylinder. For example, the display movement mechanism 170 may be configured to be moved by a known mechanical structure that is operated by an electric motor, such as a cam structure, a gear structure, or a link structure, and may have the combined form of a cylinder and a mechanical structure.

In addition, the display movement mechanism 170 may be configured to move the first curved display 130 and the second curved display 150 respectively or together.

As illustrated in FIGS. 1 and 2, the stereoscopic image device 100 having improved immersiveness according to the embodiment of the present invention may include an operating mechanism 135.

The operating mechanism 135 may provide operating information to allow the viewer to operate images displayed on the first curved display 130 and the second curved display 150.

The operating information generated by the viewer using the operating mechanism 135 may be used, a controller, which controls the stereoscopic image device 100 having improved immersiveness, to control an image to be displayed or to control the seat movement mechanism 120 or the display movement mechanism 170.

In addition, the operating mechanism 135 may be formed as any of various known operating mechanisms 135 such as a known game controller, joystick, handle, steering wheel, switch, and button. The operating mechanism 135 may be formed as a touch panel, which is attached to the first curved display 130 so as to generate an operating signal when the viewer touches the first curved display 130.

The operations and effects of the above respective components will be described below.

In the stereoscopic image device 100 having improved immersiveness according to the embodiment of the present invention, the viewer views images displayed on the first curved display 130 and the second curved display 150 in the state of sitting on the seat 115 on the moving stage 110.

The viewer may select or operate the images displayed on the first curved display 130 and the second curved display 150 via the operating mechanism 135, and may directly control the images.

When an image is displayed, the controller may control the seat movement mechanism 120 according to the displayed image so as to directly move the viewer by moving the seat 115, which may allow the viewer to feel a sense of realism as if the viewer had entered the scene.

In addition, the controller may adjust the distances between the first curved display 130, the second curved display 150, and the moving stage 110 according to the displayed image so as to cause the image to become closer to or farther away from the viewer, which may further improve a sense of realism.

Meanwhile, the stereoscopic image device 100 having improved immersiveness according to the embodiment of the present invention may be used as a simulator of a vehicle, an airplane, or the like.

Accordingly, the stereoscopic image device 100 having improved immersiveness according to the embodiment of the present invention may display an image having a 2.5-dimensional effect by displaying curved images on the first curved display 130 and the second curved display 150, and may allow the viewer to view an image having an increased three-dimensional effect by viewing the first image displayed on the first curved display 130 and the second image displayed on the second curved display 150 in the overlapping state.

In addition, by moving the seat 115 on which the viewer sits according to the displayed image, it is possible to provide a sense of realism. When the displays are moved in addition to the viewer, it is possible to provide a so-called "4-dimensional" experience.

In addition, because the first curved display 130 and the second curved display 150 are larger than the viewing angle SA, or are located inside the sides of the viewing angle SA, it is possible to prevent the edges of the first curved display 130 and the second curved display 150 from being seen, which may further increase a sense of realism.

Hereinafter, a game apparatus 200 using the stereoscopic image device 100 having improved immersiveness according to the embodiment of the present invention will be described.

As illustrated in FIGS. 4 and 5, the game apparatus 200 using the stereoscopic image device 100 having improved immersiveness according to the embodiment of the present invention may include the stereoscopic image device 100.

The stereoscopic image device 100 is configured in the same manner as the stereoscopic image device 100 having improved immersiveness according to the embodiment of the present invention described above, and thus a detailed description thereof will be omitted.

As illustrated in FIGS. 4 and 5, the game apparatus 200 using the stereoscopic image device 100 having improved immersiveness according to the embodiment of the present invention may include a game box 210.

The game box 210 may accommodate the stereoscopic image device 100 therein.

The game box 210 may be formed to have a room shape and may be provided with a door 211 for the entry and exit of the viewer. The inside of the game box 210 may be sealed to block external light in order to allow the viewer inside the game box to be immersed in the viewing of an image displayed on the stereoscopic image device 100.

The inside of the game box 210 may be black to allow the viewer to be completely immersed in the image.

As illustrated in FIGS. 4 and 5, the game apparatus 200 using the stereoscopic image device 100 having improved immersiveness according to the embodiment of the present invention may include a box driving mechanism 230.

The box driving mechanism 230 may move the entire game box 210 to transfer movement to the viewer.

The box driving mechanism 230 may move the game box 210 in various directions, like a ride.

For example, the box driving mechanism 230 may move the game box 210 in various ways, such as, for example, rotate the game box about an arbitrary axis, generate vibrations, or tilting the game box to one side.

The box driving mechanism 230 may be configured with a pneumatic or hydraulic cylinder, and may be configured to have a mechanical structure that is operated by an electric motor, such as a cam structure, a gear structure, or a link structure, and may have the combined form of a cylinder and a mechanical structure.

The box driving mechanism 230 may be controlled along with the stereoscopic image device 100 according to the displayed image by the controller, which controls the stereoscopic image device 100.

In the game apparatus 200 using the stereoscopic image device 100 having improved immersiveness according to the embodiment of the present invention, the viewer may enter the game box 210 and sit on the seat 115 on the moving stage 110 to play a game using the operating mechanism 135 while viewing images displayed on the first curved display 130 and the second curved display 150.

Meanwhile, when playing a game, the controller moves the viewer on the moving stage 110 using the seat movement mechanism 120, and changes the positions of the first curved display 130 and the second curved display 150 by the display movement mechanism 170, thereby increasing a sense of realism of the game and a sense of immersion of the game.

In addition, the controller controls the box driving mechanism 230 according to a game image so that the box driving mechanism 230 moves the entire game box 210 in order to increase a sense of realism as if the viewer has entered the scene.

Accordingly, the game apparatus 200 using the stereoscopic image device 100 having improved immersiveness according to the embodiment of the present invention may provide a four-dimensional experience to the viewer using the stereoscopic image device 100, and may also provide the viewer with a sense of five-dimensional realism, beyond a sense of four-dimensional realism, by moving the entire game box 210 using the box driving mechanism 230.

Here, the term "five-dimensional" indicates a greater sense of immersion than that provided by "four-dimensional" technology.

It will be apparent that, although the preferred embodiments have been shown and described above, the disclosure is not limited to the above-described specific embodiments, and various modifications and variations can be made by those skilled in the art without departing from the gist of the appended claims. Thus, it is intended that the modifications and variations should not be understood independently of the technical sprit or prospect of the disclosure.

INDUSTRIAL APPLICABILITY

The present invention may be used in the display, movie, and gaming fields for the display of a stereoscopic image.

The invention claimed is:

1. A stereoscopic image device having improved immersiveness, comprising:
    a moving stage comprising a seat on which a viewer sits, and a seat movement mechanism configured to move the seat based on a displayed image;
    a first curved display located in front of the viewer facing thereto to display a first image, the first curved display being transparent and having a concavely curved shape in a direction viewed by the viewer; and
    a second curved display located behind the first curved display to display a second image overlapping the first image, the second curved display having a concavely curved shape in the direction viewed by the viewer.

2. The device according to claim 1, further comprising a display movement mechanism configured to move positions of the first curved display and the second curved display in association with each other according to movement of the seat on the moving stage.

3. The device according to claim 1, wherein the second curved display has a size larger than a size of the first curved display.

4. The device according to claim 3, wherein the second curved display is sized such that an edge thereof is located along a side of a viewing angle, which is defined by connecting the viewer to an edge of the first curved display, or is sized such that the edge thereof is located at a position deviating from the side of the viewing angle.

5. The device according to claim 1, further comprising an operating mechanism configured to be operated by the viewer in order to control the images.

6. The device according to claim 1, further comprising an operating mechanism in the form of a touch panel that overlaps the first curved panel and generates an operating signal.

7. The device according to claim 1, wherein the second curved display is one selected from among a screen on which an image is displayed by a beam projector, an LCD, an OLED, and a PDP.

8. The device according to claim 1, wherein the first curved display and the second curved display have different curvatures.

9. A game apparatus using a stereoscopic image device having improved immersiveness, the game apparatus comprising:
the stereoscopic image device comprising a moving stage comprising a seat on which a viewer sits, and a seat movement mechanism configured to move the seat based on a displayed image, a first curved display located in front of the viewer facing thereto to display a first image, the first curved display being transparent and having a concavely curved shape in a direction viewed by the viewer, and a second curved display located behind the first curved display to display a second image overlapping the first image, the second curved display having a concavely curved shape in the direction viewed by the viewer;
a game box in which the stereoscopic image device is accommodated; and
a box driving mechanism configured to move the game box according to a game displayed on the stereoscopic image device.

10. The apparatus according to claim 9, further comprising a display movement mechanism configured to move positions of the first curved display and the second curved display in association with each other according to movement of the seat on the moving stage.

11. The apparatus according to claim 9, wherein the second curved display has a size larger than a size of the first curved display.

12. The apparatus according to claim 11, wherein the second curved display is sized such that an edge thereof is located along a side of a viewing angle, which is defined by connecting the viewer to an edge of the first curved display, or is sized such that the edge thereof is located at a position deviating from the side of the viewing angle.

13. The apparatus according to claim 9, further comprising an operating mechanism configured to be operated by the viewer in order to control the images.

14. The apparatus according to claim 9, further comprising an operating mechanism in the form of a touch panel that overlaps the first curved panel and generates a touch signal.

15. The apparatus according to claim 9, wherein the second curved display is one selected from among a screen on which an image is displayed by a beam projector, an LCD, an OLED, and a PDP.

16. The apparatus according to claim 9, wherein the first curved display and the second curved display have different curvatures.

* * * * *